April 8, 1952

M. O. DUBOIS ET AL
DEVICE FOR ADJUSTING THE RETURN
TRAVEL OF FLUID ACTUATED MEANS 2,591,793

Filed Feb. 26, 1947

INVENTORS
MAURICE ODILE DUBOIS
BERNARD MAURICE DUBOIS

BY Otto Munk

HIS ATTY

INVENTORS
MAURICE ODILE DUBOIS
BERNARD MAURICE DUBOIS
BY Otto Munk
THEIR ATTY

Patented Apr. 8, 1952

2,591,793

UNITED STATES PATENT OFFICE 2,591,793

DEVICE FOR ADJUSTING THE RETURN TRAVEL OF FLUID ACTUATED MEANS

Maurice Odile Dubois and Bernard Maurice Dubois, Soisy-sur-Montmorency, France

Application February 26, 1947, Serial No. 731,154 In France November 28, 1945

Section 1, Public Law 690, August 8, 1946 Patent expires November 28, 1965

2 Claims. (Cl. 60—54.5)

In installations for the remote control, by means of a fluid which is incompressible or slightly compressible, such as oil for example, of any controlled device or mechanism (braking device, clutch mechanism, tool, etc.) a delicate problem is set by the return to the inoperative position of said controlled mechanism when the pressure which has acted on it stops since it is important that between the inoperative and the operative positions there should be a predetermined margin, i. e., a given play, or a certain travel of the members which will hereinafter be called "return travel." It is advantageous for numerous reasons, some of which are of capital importance and involve safety requirements, that this return travel shall be known and preferably be constant. In the operative position, the controlled member or members generally abut (brake shoes against brake drums, clutch discs against conjugated discs, tool against workpiece, etc.) and such members are subjected to a certain wear. Consequently the return travel cannot be fixed in space, since one of its origins is movable owing to wear (or for any other reason). It is therefore important to be able to obtain, in such remote control devices, a constant but floating return travel, i. e., without a fixed origin, of the controlled device, if it is desired to obtain the requisite conditions for reliability of operation which are so important in the case of brakes in particular.

On the other hand, in other remote control installations, the end of travel abutment is not subjected to wear, but in such installations it is important, as in the previously mentioned ones, to obtain a return travel of given value.

The present invention has for its object to provide improvements in installations remotely controlled by fluid pressure.

A further object of the invention is to provide a device adapted to ensure automatically a return travel of given amplitude, in any controlled mechanism (brake, clutch or other mechanism) which is controlled in one direction by a pressure fluid that may be compressible or not, and which may be provided at the end of its operative travel with an abutment which may or may not be subjected to wear.

This device comprises a chamber adapted to be permanently and directly connected to the controlled mechanism and, through a slide valve or other closure device, to the source of pressure fluid, and a member connected to said valve (or other closure device) and adapted to move in said chamber between an inoperative position in which the valve closes the communication between said chamber and the source of pressure fluid and an operative position in which said communication is open, the whole arrangement being such that the volume of said chamber increases, when said member moves from the operative position to the inoperative position, by a value corresponding to the desired return travel for the controlled device.

According to another feature, if the fluid used is compressible, a loaded auxiliary valve is provided which forms a by-pass and which allows the excess volume of fluid to flow from the tail side towards the head side when during the return to the inoperative position the pressure on the tail side exceeds a given value.

The invention has also for its object the various applications of this device and, in particular, the installations for the remote control of brakes, clutches, tools, etc. by means of a fluid which may be compressible or not, said installations being provided, before the controlled device or each controlled device with one of the devices of the above-mentioned type.

Other features of the invention will appear from the following description.

In the accompanying drawing, given by way of example:

Figure 1:
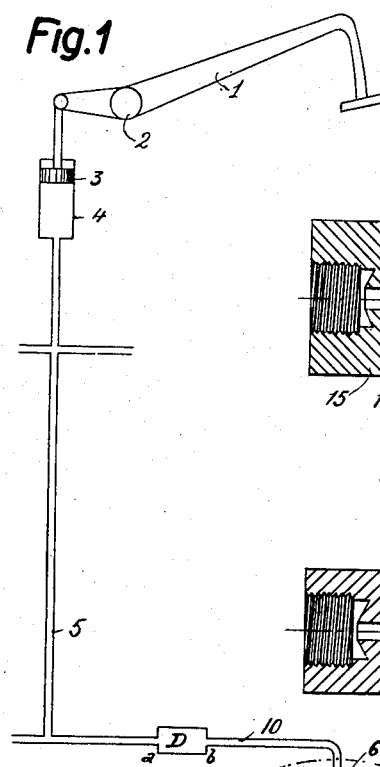
Fig. 1 shows diagrammatically an installation for the hydraulic control of a brake, provided with a device according to the invention.

According to the embodiment illustrated in Fig. 1 the hydraulic control installation is intended to operate a braking device. It comprises, as known per se, a pedal or other operating member 1, which is pivoted at 2 and acts on the piston 3 of a master-cylinder 4 in such a manner as to drive the oil or other pressure fluid which it contains into the pipe 5.

This installation leads to each of the devices to be controlled, for example to the cylinder 6 of a braking device, in which two pistons 7, which are adapted to move in opposite directions, act on the brake shoes 8. The pistons 7 tend to press them against the drum 9. When the pressure falls in the cylinder 6, a spring 10a retracts them. In the known devices, the shoes are generally retracted against an abutment. If said abutment is fixed, the successive travels for engaging the shoes with the drum 9 and the return travels are variable and are increased by the gradual wear, on the one hand and particularly of the friction surfaces of the friction linings carried by the shoes 8, and on the other hand of the drum 9.

This is a serious drawback which can be overcome by the device according to the invention which makes it possible to have without an abutment a constant floating return travel. This device is interposed at D in the pipe 10 leading to the cylinder 6. In a multiple control installation, one may be provided for each controlled device, for example one for each wheel in the case of a hydraulic braking mechanism.

Figure 2:
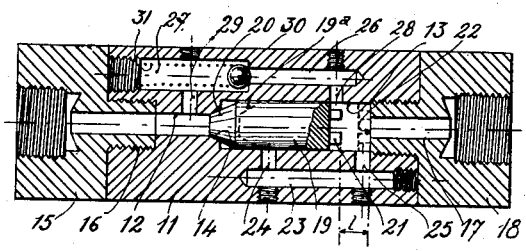
Figs. 2 to 5 are longitudinal sections, in the inoperative position, of devices according to the invention.

According to the embodiment shown in Fig. 2, the device comprises a body 11 provided with an axial bore formed by a duct 12 extended by a cylindrical housing 13 of larger diameter the connecting surface between the duct 12 and the housing 13 comprising a frusto-conical portion 14. The duct 12 extends into a connecting member 15 screwed at 16 in the body 11; said member 15 is intended to be connected at a (Fig. 1) to the fluid supply from the master-cylinder 4.

Similarly, the cylindrical housing or chamber 13 is extended by a duct 17 of a connecting member 18 which is intended to be connected at b (Fig. 1) to the pipe 10 leading to the device to be controlled or optionally forming part of same.

In the cylinder 13 is housed a piston 19 which, on the head side, has a frusto-conical portion 20 which can bear against and form a joint with the frusto-conical bearing surface 14. On the tail side, the piston 19 is extended by projections 21 which are adapted to bear against the edge 22 of the connection 18 about the outlet hole 17. The piston 19 is of such a length that when it is pressed against the conical bearing surface 14 there is, between the ends of its projections 21 and the edge 22 of the connection 18, a free length 1 corresponding to a given volume V of the cylindrical housing 13.

The device is completed in the body 11 on the one hand by a duct 23 opening into the bore 13 through holes 24 and 25, the first 24, being located in such a manner that it is uncovered by the piston 19 when its projections 21 move against the edge 22 of the connection 18 and the second 25, being located against said edge 22, and on the other hand, by another duct comprising two parts 26 and 27 of different diameters, that of smaller diameter opening into the cylindrical chamber 13 through a hole 28 in front of the tail side of the piston 19 when said piston is in the inoperative position against the bearing surface 14, and the other into the duct 12 through a hole 29. The connecting shoulder between the two parts 26 and 27 forms the seat for a ball or other valve 30 which is held on its seat by a loaded spring 31.

The device operates as follows: When the pedal 1 or other member is depressed, the master-cylinder 4 sends pressure fluid into the pipe 5. This pressure is exerted through the duct 12 on the piston 19 which is urged towards the right up to the position 19a shown in dot and dash lines, its projections 21 then abutting against the edge 22 of the connection 18. The chamber 13 has decreased in volume V and the same thing has consequently occurred in all the pipes after it, said chamber being constantly connected to all these pipes.

Owing to its movement, the piston 19 uncovers the hole 24, thereby placing the head duct 12 in communication with the tail duct 17 through said hole 24, the duct 23, the hole 25 and the remainder of the chamber 13 between the projections 21 of the piston. The oil or other liquid or fluid can therefore reach, through the device D, the controlled device and, in the example of Fig. 1, press the shoes 8 against the drum 9 against the action of the retracting spring 10a.

It will be observed that during this phase, the opening 28 is closed by the piston 19 and the valve 30 is pressed against its seat not only by the spring 31 but also by the pressure head which is exerted in the chamber 27.

At the instant when the driver allows the pedal 1 to return (Fig. 1), the pressure tends to become zero on the head side of the piston 19 and said piston is driven back by the pressure exerted in the chamber 13 by the tail-side fluid subjected to the action of the spring 10a which retracts the shoes 8. Said piston 19 is therefore abruptly pressed on to its frusto-conical seat 14 which prevents any return leakage; it is therefore absolutely impossible for the liquid to flow from the chamber 13 into the duct 12 through the duct 23 and the holes 24, 25.

The piston 19 having returned to its starting position, partly frees the chamber 13 which is increased in volume by V, and as said chamber is free to communicate with the controlled device, the volume of the latter can decrease by the same amount, which corresponds, with an incompressible fluid, to a certain movement of the shoes 8, i. e., to a certain play of said shoes relatively to the brake drum 9 whatever may have been their wear during the braking period which has just been completed. It should be noted that during this braking period, however considerable the wear may have been it has not affected the braking since throughout said period, the head and the tail sides of the device 4 were in communication with one another and a fresh flow of pressure liquid has, if necessary, exactly compensated any additional movement of the controlled device due to wear of the braking members.

However, in transmitting the desired pressure, the control fluid, when gaseous is compressed, thereby increasing the initial volume V by an additional volume which is variable with the pressure exerted. This volume does not allow of the return travel or of the play of the controlled members and leaves said members compressed. In order to obviate this drawback, the valve 30, which the piston 19 as it moved backwards has placed in communication through the hole 28 and the duct 26 with the chamber 13, becomes operative. Said valve is loaded so as to leave in the tail pipe 10 a pressure which is substantially equal to the pressure exerted by the retracting spring 10a for the brake shoes 8 of other controlled member, this pressure being intended to provide the necessary pressure for pressing the piston 19 against its seat 14.

The valve 30 accordingly exhausts the excess of fluid towards the head end and reduces the volume located after the piston to the initial volume and pressure.

Therefore, in every case, whether the fluid is compressible or not, the device provides a given return travel, the pressure below the device being adjusted by the valve 30. The device definitely provides an automatic take-up of the wear, the floating return travel starting, each time, from the last wear abutment, i. e., from the last position of the shoes 8 pressed against the drum 9, wear having been taken up.

Figure 3:
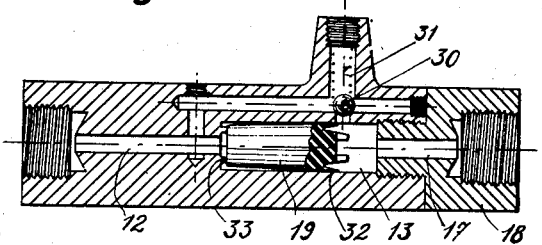

Fig. 3 shows a modification: the metal piston 19 of the previous example is replaced by a piston of yieldable material which, after it has abutted at the end of its travel towards the right, allows the necessary fluid to pass for operating the brake by lifting lips 32. During the return travel, fluid-tightness is obtained by the piston bearing against its suitably shaped seat and/or by the lips 32 pressed against the wall of the chamber 13, and the valve 30 becomes operative if necessary, as in the previous example.

Figure 4:
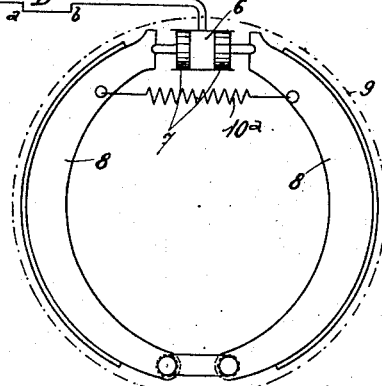
Figure 4:
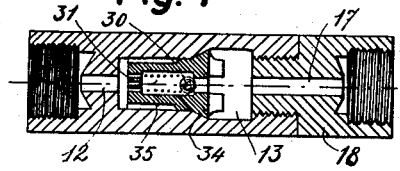

In the modification shown in Fig. 4, the piston 19 forms a valve by means of a frusto-conical shoulder 34 co-operating with a similarly shaped shoulder of the chamber 13.

Furthermore, the piston is provided with grooves 35 of sufficient cross-section for the fluid to pass. Said grooves are only uncovered when the piston has effected its stroke towards the connection 18.

On the other hand, the valve 30, which is intended to reduce the pressure after it when the device is inoperative to the desired value in the case of a compressible liquid, is housed in the piston 19 which is provided with a longitudinal bore.

The operation is the same as before. When the pressure increases on the head side owing to the operation of the pedal 1, the fluid lifts the piston 19, flows through the grooves 35, the periphery of the valve, and controls the device to be controlled. During the return travel of the brake pedal, the piston moves backwards and closes the circuit. Otherwise everything takes place as in the two previous examples.

Figure 5:
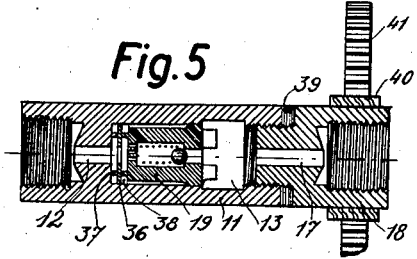

Fig. 5 shows another modification which only differs from the previous one by the construction of the main valve. As in the two first examples, it is provided at the end of the piston 19 on the head side, and comprises for example a ring of rubber or like material, resting on an annular projection 37 of the end of the bore of the body 11 round the duct 12, and the piston 19 terminates in an annular projection 38 opposite the previous one.

The operation is the same as in the examples already described.

Naturally, a device may be provided for varying the return travel at will. For this purpose, it is only necessary to vary the volume V.

This variation may be effected for example either by means of one or a plurality of intercalary washers 39 (Fig. 5) interposed between the body 11 and the connection 18, or by means of a relative movement of the body 11 and of the connection 18, its being possible to control said movement from a distance, the connection 18 may, for example, be screwed or unscrewed, from a distance, relatively to the body 11. Said connection 18 may, for example, be provided with external teeth 40 meshing with a rack 41 or any other operating member.

The device according to the invention is applicable to any controlled mechanisms, other than brakes with external or internal shoes or disc brakes with multiple discs or not. It will be understood for example that if one of the devices described is inserted in the control circuit of a clutch mechanism operated by pressure fluid, it will permit of a given play or return travel of the disc or discs or other clutch members, whatever may be their state of wear.

Such a device is particularly necessary for multiple disc clutches, since although in certain cases the increases of travel due to wear are comparatively unimportant, this is not the case for certain adaptations such for example as those intended for reversing gears in ships in which the times of operation are a prime element of safety.

Now, in this case, the values of the volumes to be filled increase proportionally to the length of the travels, thereby increasing the times of operation in an extent which might be extremely great, eliminating the constancy which is absolutely necessary for safety.

Figure 6:
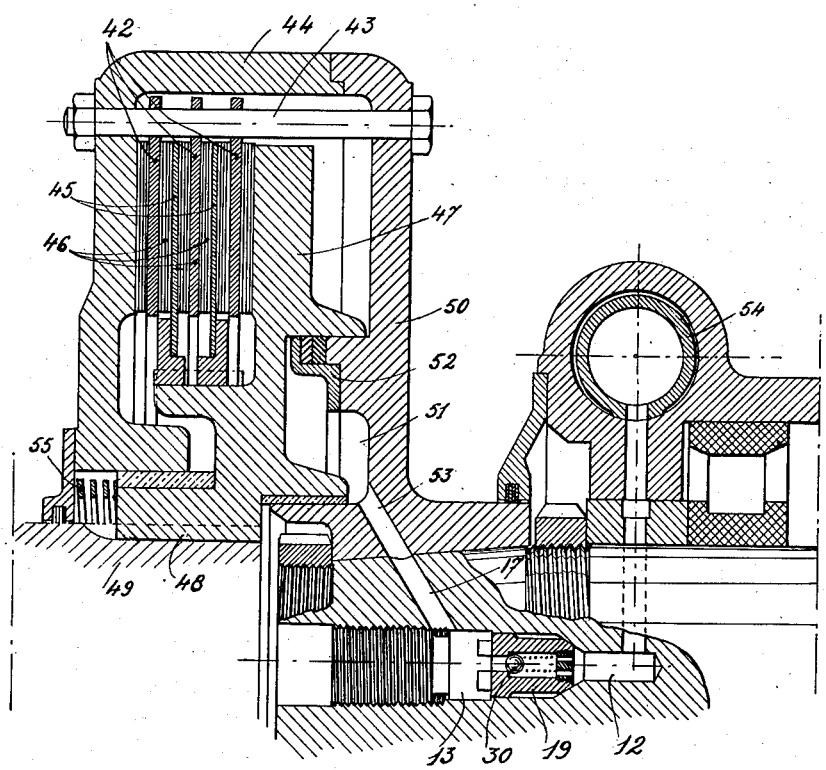
Fig. 6 shows in section an application of the device to the hydraulic control of a multiple disc clutch or brake.

By way of example, Fig. 6 shows the device according to the invention applied to a fluid controlled multiple disc clutch. A set of discs 42 is secured by a number of bolts 43 to the outer element 44 which is, for example the driven or the driving element. The other set of discs 45, which are interposed between the first and are separated from same by friction packings 46, is secured to an element 47 which forms a piston and which is slidably keyed at 48 on the driving (or driven) shaft 49. This piston 47 forms with the plate 50, which is secured to the portion 44, a chamber 51 which is made fluid-tight by a joint 52. The pressure fluid is supplied to said chamber through a duct 53. Said duct is connected through a device according to the invention to a supply pipe for the pressure fluid, this supply being controlled for example by a distributor cock 54.

The device operates as follows: as the pressure fluid flows in through the distributor 54 and the duct 12 it pushes back the piston 19 which allows the fluid to pass towards the receiving chamber 51 and thereby effects the engagement of the whole clutch.

The distributor being closed, the retracting spring 55 returns the plate 47 which pushes back the fluid, the piston 19 is pushed back on to its seat, allowing to remain below it the volume V necessary for the play provided in the clutch.

As in the other applications, the excess fluid valve 30 becomes operative if necessary and leaves the discs in the position corresponding to the desired play.

Naturally the invention is in no way limited to the embodiments and the applications illustrated and described which have only been chosen by way of examples. The piston may be replaced by any other member such as a membrane performing the same function.

The device can of course be applied for obtaining the play in tools, or other objects in fluid controlled machines which do not necessarily have at the end of their operative travel an abutment subjected to wear.

Having now described my invention what I claim as new and desire to secure by Letters Patent is:

1. A device adapted to provide automatically a return travel of given amplitude in a mechanism controlled in one direction by a pressure fluid and in the other direction by retracting means, said device comprising a cylinder having an opening at both ends, means for respectively connecting said openings with a fluid supply on the one hand and said mechanism on the other hand, a piston of yieldable material slidably received in the cylinder and adapted to close the opening of the fluid supply and of the cylinder when completely moved towards the same, said piston having a peripheral annular lip adapted to be normally in tight relation with the wall of the cylinder and to move off said wall for passing fluid when fluid pressure is applied on the supply end of the piston, the length of the cylinder being such that the volume variation of the chamber at the end of the piston opposite to the supply side when the piston is moved from one end of the cylinder to the other is equal to the volume variation in the controlled mechanism corresponding to the return travel of the machine.

2. In a device as claimed in claim 1 a check valve between said chamber and the fluid supply end of the cylinder for by-passing fluid from said chamber when the pressure therein exceeds a given value.

MAURICE ODILE DUBOIS.
BERNARD MAURICE DUBOIS.

REFERENCES CITED

The following references are of record in the file of this patent:

UNITED STATES PATENTS

| Number | Name | Date |
|---|---|---|
| 697,140 | Goldschmidt | Apr. 8, 1902 |
| 2,156,120 | La Brie | Apr. 25, 1939 |
| 2,345,811 | Harp | Apr. 4, 1944 |

FOREIGN PATENTS

| Number | Country | Date |
|---|---|---|
| 365,069 | Great Britain | Jan. 6, 1932 |
| 389,930 | Great Britain | Mar. 30, 1933 |